United States Patent [19]

Salaam

[11] Patent Number: 4,553,331

[45] Date of Patent: Nov. 19, 1985

[54] CENTERING APPARATUS AND METHOD

[76] Inventor: Ameen Salaam, 7558 S. Essex Ave., Chicago, Ill. 60649

[21] Appl. No.: 484,932

[22] Filed: Apr. 14, 1983

[51] Int. Cl.⁴ ............................................... G01B 5/25
[52] U.S. Cl. ................................ 33/172 D; 33/169 C; 33/180 R
[58] Field of Search ............ 33/172 D, 172 R, 172 B, 33/169 C, 169 R, 180 R, 174 Q, 174 R, 185 R

[56] References Cited

U.S. PATENT DOCUMENTS

| | | |
|---|---|---|
| 1,865,927 | 7/1932 | Lambert. |
| 2,131,973 | 10/1938 | Rusnak et al.. |
| 2,483,743 | 10/1949 | Turrettini ...................... 33/172 D X |
| 3,129,512 | 4/1964 | Schiler ........................ 33/174 R X |
| 3,129,918 | 4/1964 | Bradley ........................ 33/172 D X |
| 3,442,478 | 5/1969 | Parapetti ...................... 33/172 D X |
| 3,848,337 | 11/1974 | Kraklau ........................... 33/174 H |
| 4,319,400 | 3/1982 | Chung ................................ 33/169 C |

FOREIGN PATENT DOCUMENTS 365547 12/1962 Switzerland.
1368132 9/1974 United Kingdom ............ 33/185 R Primary Examiner—Harry N. Haroian
Attorney, Agent, or Firm—Neuman, Williams, Anderson & Olsen

[57] ABSTRACT

The device of the invention comprises a stationary member, a moveable member adjacent to said stationary member, indicator means attached to the moveable member for contacting a work piece, said indicator means being moveable through a substantially 360 degree arc in a plane substantially perpendicular to the center axis of the machine drive member, fixing means for alternatively permitting or preventing movement of the moveable member relative to the stationary member, and locating means on said moveable member and on said stationary member for indicating the relative position of the moveable member to the stationary member in each quadrant of that arc.

The method of the invention comprises four steps in which the work piece is centered with respect to a machine tool drive member along two perpendicular axes.

13 Claims, 3 Drawing Figures

CENTERING APPARATUS AND METHOD

BACKGROUND OF THE INVENTION

This invention relates to devices for enabling an operator to center a work piece with respect to the drive member of a machine tool, such as a vertical mill, a horizontal mill or a horizontal boring mill. It commonly takes a great deal of time and effort to perform the centering operation, and devices which facilitate that operation are therefore of great utility.

The usual manner of centering a work piece on the work platform of a machine such as a vertical mill is to employ a holding bar assembly which is affixed to the machine spindle and to which is attached an indicator. The structure and function of such holding bars and indicators are well-known, as evidenced by the radially-adjustable indicator disclosed by Bradley, U.S. Pat. No. 3,129,918. Such combinations can, depending on the characteristics of the work area of the machine, be utilized to center a work piece in either of two ways.

One manner of centering the work piece while using such a holding bar and indicator arrangement is to first secure the work piece to the work platform and then adjust the indicator so that it engages one of the outer edges (first edge) of the work piece. The radial position of the indicator on the holding bar having been noted, the indicator is then moved radially away from the machine spindle so as to clear the first edge of the work piece, and the spindle is rotated approximately one-half turn so that the indicator is now in proximity with the opposite edge (second edge) of the work piece. The indicator is then returned to its previous position on the holding bar, and by reference to the distance between the indicator and the second edge of the work piece, the work piece is moved relative to the spindle so that its position more closely approximates the desired centered position with respect to the axis of the work piece which lies between the first and second edges.

The indicator is then moved along the holding bar so that it engages the second edge of the work piece and its radial position is noted. Next, the indicator is moved radially outward to clear the second edge of the work piece, and the machine spindle is again rotated approximately one-half turn. The above procedure is then alternately repeated on the first and second edges of the work piece until no adjustment of the position of the work piece is required to permit the indicator to engage each of the first and second edges of the work piece while the indicator is at one particular radial position. When these steps are completed, the axis of the work piece which lies between the first and second edges will be centered with respect to the machine spindle.

The entire procedure is then duplicated in order to center the axis of the work piece which lies between the third and fourth edges with respect to the machine spindle. When both axes of the work piece are simultaneously centered with respect to the machine spindle, the work piece itself will be centered with respect to the machine spindle.

The second way of centering the work piece is in principle the same as the first, the difference being that the work platform of the machine with the work piece clamped thereto, rather than the machine spindle, is rotated.

Both centering procedures consume a great deal of the operator's time, inasmuch as they require numerous approximations of the desired position of the work piece due to the trial-and-error nature of the procedures. Moreover, because the operator centers the work piece by visually approximating a one-half rotation of either the work center or the machine spindle, these procedures have inherent inaccuracies and cannot be relied upon to locate the exact center of the work piece.

SUMMARY OF THE INVENTION

In accordance with the present invention a new apparatus and method are provided for centering a work piece on a machine tool in a speedy and accurate manner. The apparatus of the invention is a centering device intended for use with a machine tool, such as a vertical mill, a horizontal mill or a horizontal boring mill, having a drive member and a work platform in opposed relation to that drive member for accommodating a work piece. The centering device of the invention is connected to the drive member; it comprises a stationary member, a moveable member which is attached to said stationary member, an indicator attached to the moveable member for contacting the work piece, which indicator is moveable or displaceable throughout a substantially 360 degree arc, a fixing means which alternatively permits or prevents movement of the moveable member relative to the stationary member, and locating means for indicating the relative position of the moveable member to the stationary member in each quadrant of the arc of movement so as to permit the determination of the center point of the workpiece.

In a preferred form of the apparatus of the invention, the stationary member is a vertically-disposed shaft which is affixed to the drive member of the machine tool. Upon the vertically-disposed shaft are two fixed circular collars whose function it is to hold in place a rotatable member, one collar being disposed above the rotatable member the other below it. The rotatable member, which, as noted, is held in place by the upper and lower collars, is preferably a flat, modified pie-shaped member having on one side an arcuate edge and on the opposite side a support portion for accommodating an indicator assembly. Of course, other shapes of the rotatable member are considered within the scope of this invention. Preferably, the indicator assembly includes an indicator holding bar, which extends from the rotatable member, and a dial-type indicator attached to the holding bar. The dial-type indicator is preferably one which has a resilient sensing means which enables it to register contact between it and the work piece. The locating means of the apparatus of the invention preferably comprises the combination of a mark inscribed on the arcuate edge of the rotatable member, most preferably at the center of that arcuate edge, and a series of four marks inscribed on the circular outer edge of the planar surface of each of the upper and lower fixed collars, said marks being disposed at 90 degree intervals. It has been found that the task of aligning the mark on the rotatable member with any one of the marks on the fixed collars is greatly facilitated if the circular outer edge portion of the planar surface of each fixed collar is at least partially chamfered. Preferably, the fixing means of the apparatus of the invention comprises a pair of set screws accommodated within the rotatable member which may be tightened down against the vertical shaft, thus preventing the rotatable member from rotating with respect to the shaft.

The operation of the centering device so described is most easily understood by reference to its use in a machine tool having a work platform which is moveable with respect to the supporting work bed in two directions, each perpendicular to the other. Such a machine tool is also provided with means, such as a scale, for indicating the position of the work center with respect to the machine bed.

The method of the instant invention may now be understood by reference to the use of the apparatus of the invention.

Once the centering device of the invention is mounted on the drive member of the machine tool, such as a vertical mill, and the work piece is secured on the work platform, the work piece may be centered with respect to the drive member in four steps.

In the first step, the work platform with the work piece attached is moved in a first direction toward the indicator until the first edge of the work piece touches the indicator. The position of the moveable work platform with respect to the fixed work bed is then noted by recording or observing the reading on the scale provided for that purpose.

In the second step, the set screws on the rotatable member are loosened, and the rotatable member is rotated exactly 180 degrees by aligning the mark on its arcuate edge with the appropriate marks on the upper and lower fixed collars, which marks are exactly 180 degrees from the original position of the mark on the rotatable member. The set screws are then tightened to prevent rotation of the rotatable member with respect to the fixed member. The work platform is then moved in a second direction toward the indicator (in its new position) until the second edge of the work piece (the edge opposite the first edge) touches the indicator. The position of the work platform with respect to the fixed work bed is then noted by again observing or recording the reading on the scale provided.

With the first and second steps now completed, the midpoint of the distance between the first and second positions of the work platform may now easily be determined by reference to the readings taken from the scale during steps 1 and 2; i.e., the midpoint will be half the distance from the first reading to the second. Thus, when the work platform is then positioned at this midpoint, the axis lying between the first and second edges of the work piece will be centered with respect to the drive member of the machine. It is important that once the work platform is adjusted so that it is positioned at this midpoint, the work platform is not again moved in either the first or second directions.

In the third step the set screws in the rotatable member are again loosened, and the rotatable member is rotated exactly 90 degrees so that the mark inscribed on its arcuate portion is adjacent to the marks on the upper and lower collars which are exactly 90 degrees from those at which the rotatable member was positioned in the second step. The set screws are then retightened in order to prevent further rotation of the rotatable member. The work platform is then moved toward the indicator until the third edge of the work piece touches the indicator. The position of the work platform with respect to the fixed work bed is noted by recording or observing the position of the work platform with respect to the fixed work bed.

In the fourth step, a procedure corresponding exactly to that in the second step is carried out, thus permitting a calculation of the midpoint of the distance between the positions of the work platform in the third and fourth steps. When the work platform has been moved so that it is at the calculated midpoint, the axis lying between the third and fourth edges of the work piece will then also be centered with respect to the machine drive member.

Inasmuch as the above four-step procedure results in the centering of the work piece along two perpendicular axes, the center point of the work piece will now lie exactly on the vertical axis of the machine drive member. As is apparent from the above, the use of the apparatus and method of the invention results in placing the exact, and not the approximate, center point of the work piece precisely on the center axis of the machine drive member, thereby greatly increasing both the accuracy of the setting-up operation and the quality of the finished work piece. Moreover, the use of the apparatus and method of the invention accomplishes that result in four steps, rather than by a time-consuming trial-and-error method.

Thus, it is an object of the invention to provide a method and apparatus for centering a work piece on a machine tool which results in a great savings of time and labor.

A related object of the invention is to provide a method and apparatus of centering a work piece which renders the cost of the machining process much less than it was formerly as the direct result of the savings in time and labor.

Another object of the invention is to provide an apparatus and method of centering a work piece on a machine tool which results in a high degree of accuracy in set-ups.

A further object of the invention is to provide an apparatus and method of centering a work piece on a machine tool which, as the result of greater accuracy, permits the production of finished work pieces which conform more closely to machining specifications.

Further objects and advantages of the instant invention will be apparent to one of skill in the art by reference to the instant specification and claims and by reference to the accompanying drawings.

DETAILED DESCRIPTION

Figure 1:
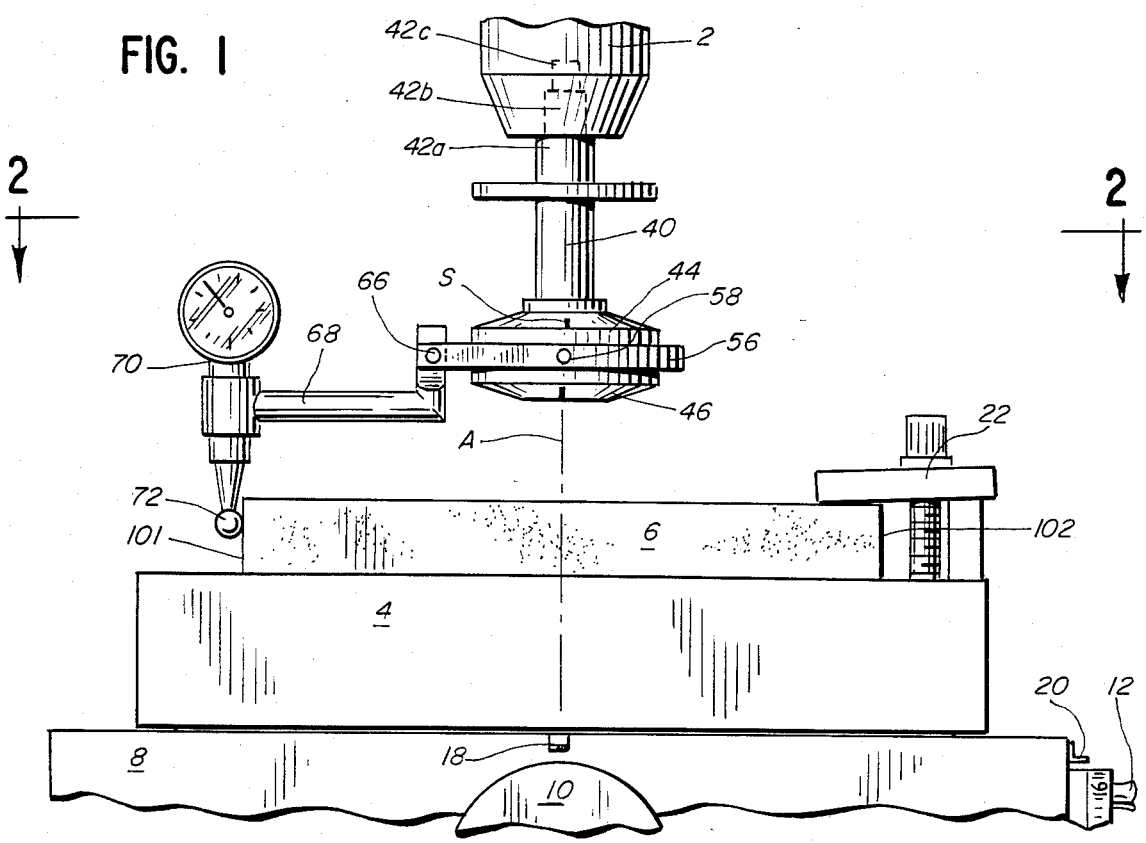
FIG. 1 is a side view of the apparatus of the invention as it appears in use with a representative machine tool having a work piece thereon.
Figure 2:
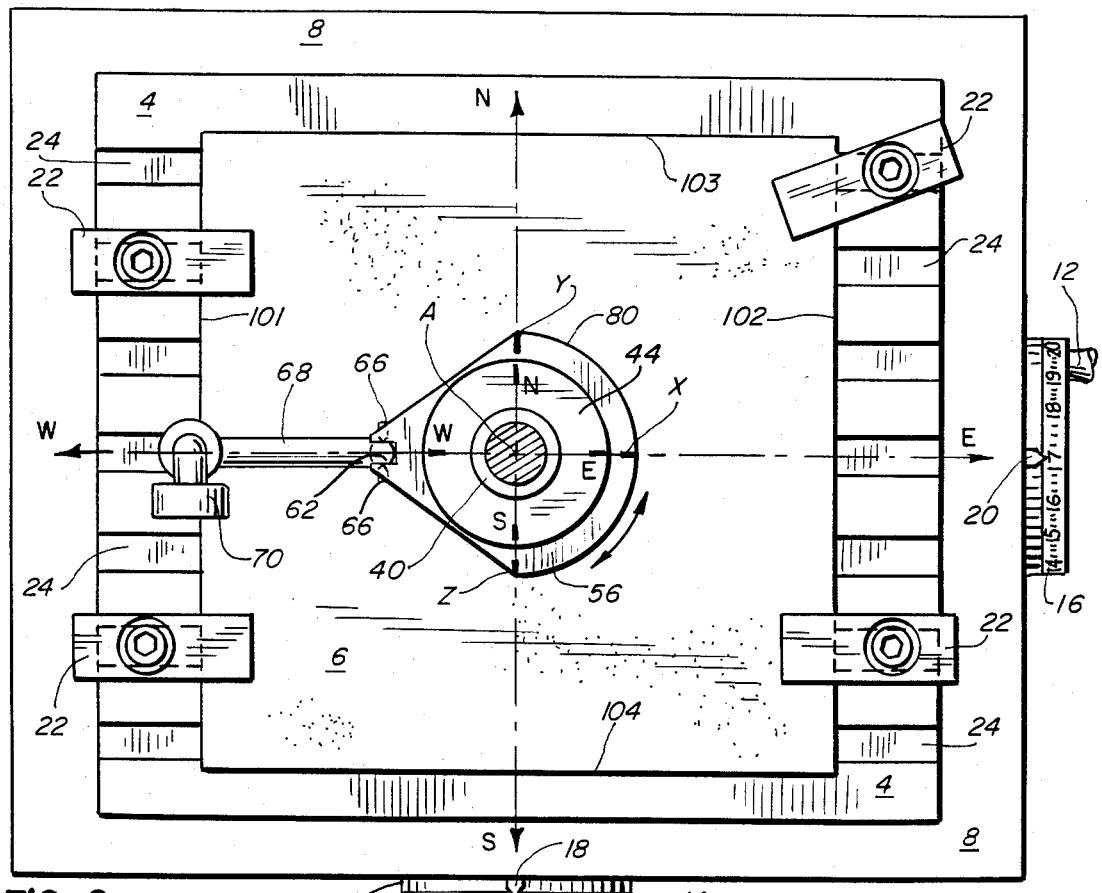
FIG. 2 is a top sectional view of the apparatus taken through line 2—2 of FIG. 1.
Figure 3:
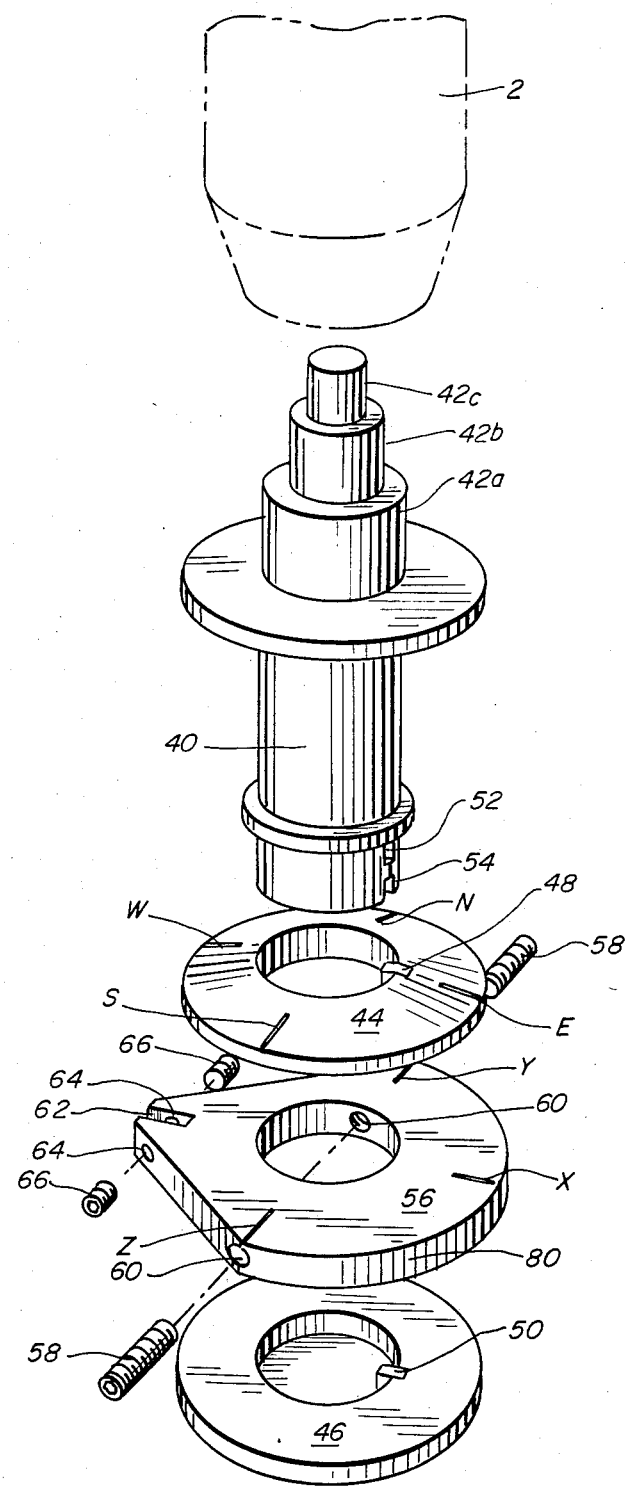
FIG. 3 is an exploded perspective view of the apparatus of the invention.

The centering apparatus on the invention, as it is used in connection with a machine tool, such as a vertical mill, is illustrated in FIGS. 1, 2 and 3.

Turning first to FIGS. 1 and 3, the apparatus of the invention is shown to include a vertically-disposed shaft 40 which is attached to the machine spindle 2 by means of one of clamping posts 42a, 42b or 42c and is stationary with respect thereto.

Secured to shaft 40 by means of keyways 52 and 54 and keys 48 and 50, respectively, are fixed upper collar 44 and fixed lower collar 46. Inscribed about the perimeter of fixed collars 44 and 46 are four marks which define points at 90 degree intervals. These marks are for convenience designated as N, E, S and W.

Held between fixed collars 44 and 46 on shaft 40 is rotatable plate 56, which accommodates set screws 58 within threaded apertures 60. It is by means of tightening or releasing set screws 58 that the rotation of plate 56 with respect to shaft 40 may alternatively be prevented or permitted. Plate 56 is also provided with a slot 62, threaded apertures 64, and set screws 66 for accommodating and securing holding bar 68. Holding bar 68 in turn supports dial-type indicator 70 which has a resilient sensing bar 72 for contacting a work piece.

As shown in FIGS. 2 and 3, rotatable plate 46 has a semicircular edge 80 directly opposite slot 62 which forms a 180 degree arc. Inscribed about semicircular edge 80 of plate 46 are three marks which define points at 90 degree intervals. These marks are for convenience designated as X, Y and Z. By selectively aligning any one of marks X, Y or Z of rotatable plate 46 adjacent to any of marks N, E, S or W of fixed collars 44 or 46 one may readily determine the relative position of rotatable plate 46 to shaft 40.

A portion of a representative machine tool, such as a vertical mill, with which the apparatus may be used, is shown in FIGS. 1 and 2 and includes a vertically-disposed spindle 2, a work bed 8, and a work platform 4 which is movable with respect to work bed 8 in each of four directions represented in FIG. 2 as N, E, S and W. A work piece 6 is secured to work platform 4 by means of detent assemblies 22 which are fastened to work platform 4 by engagement with channels 24.

The movement of work platform 4 (and consequently of work piece 6) in directions E and W is controlled by crank wheel 10, while movement in directions N and S is controlled by crank wheel 12. Crank wheels 10 and 12 have inscribed thereon scales 14 and 16, respectively, which, in combination with pointers 18 and 20, respectively, which are affixed to work bed 8, permit the determination of the position of work platform 4 with respect to work bed 8.

The method of use of the centering apparatus of the invention may be understood by reference to FIGS. 1 and 2. The four-step method of the invention is described such that, at the beginning of the centering procedure, plate 56 is fixed with respect to shaft 40 by means of set screws 58 so that mark X of plate 56 is adjacent to and aligned with mark E of collar 44.

In the first step, the work platform 4 with the work piece 6 is brought to a height sufficient to permit the first edge 101 of the work piece 6 to engage the indicator 70. The work platform 4 is then moved by means of crank wheel 10 in direction W toward the indicator until the edge 101 of the workpiece 6 contacts the sensing bar 72 of indicator 70 and registers a reading of 0.000 inches. The position of work platform 4 with respect to the work bed 8 [Position A] is noted by observing or recording the location of pointer 18 on scale 14 of crank wheel 10.

In the second step, work platform 4 is lowered by means provided on the machine tool (not shown) to permit the work piece 6 to clear the sensing bar 72. Set screws 58 are then loosened, plate 56 is rotated 180 degrees so that mark X of plate 56 is adjacent to and aligned with mark W of collar 44, and set screws 58 are tightened to prevent further rotation of plate 56. Work platform 4 is raised to its original height and is moved by means of crank wheel 10 in direction E toward indicator 70 (in its new position) so that the second edge 102 of the work piece 6 engages sensing bar 72 of indicator 70 and registers a reading of 0.000 inches. The position of work platform 4 with respect to work bed 8 [Position B] is noted by observing or recording the location of pointer 18 on scale 14 of crank wheel 10. Work platform 4 is then moved by means of crank wheel 10 so that pointer 18 is aligned with a point on scale 14 midway between the previously-recorded locations of pointer 18 at Position A and Position B. The axis N-S of work piece 6 which lies between edges 101 and 102 will now be centered with respect to spindle 2. Crank wheel 10 is not again moved during the remainder of the procedure.

In the third step work platform 4 is lowered to again permit work piece 6 to clear sensing bar 72. Set screws 58 are loosened, plate 56 is rotated 90 degrees so that mark X of plate 56 is adjacent to and aligned with mark S of fixed collar 44, and set screws 58 are re-tightened to prevent further rotation of plate 56 with respect to shaft 40. Work platform 4 is raised to its previous height and is moved by means of crank wheel 12 in direction N until the third edge 103 of work piece 6 engages sensing bar 72 of indicator 70 and registers a reading of 0.000 inches. The position of work platform 4 with respect to work bed 8 [Position C] is noted by observing or recording the location of pointer 20 on scale 16 of crank wheel 12.

In the fourth and last step, work platform 4 is once again lowered to permit workpiece 6 to clear sensing bar 72, and set screws 58 are loosened to permit plate 56 to rotate with respect to shaft 40. Plate 56 is then rotated 180 degrees so that mark X of plate 56 is aligned with and adjacent to mark N of fixed collar 44, and set screws 58 are tightened to prevent further rotation of plate 56. Work platform 4 is again raised to its previous position and is moved by means of crank wheel 12 in direction S until the fourth edge 104 of work piece 6 engages sensing bar 72 of indicator 70 and registers a reading of 0.000 inches. The position of work platform 4 with respect to work bed 8 [Position D] is noted by observing or recording the location of pointer 20 on scale 16 of crank wheel 12. Work platform 4 is then moved by means of crank wheel 12 so that pointer 20 is aligned with a point on scale 16 midway between the previously-recorded locations of pointer 18 at Position C and Position D. The axis E-W of work piece 6 which lies between edges 103 and 104 will now be centered with respect to spindle 2. Because both axes of work piece 6 (axis N-S and axis E-W) are now centered with respect to spindle 2, the geometric center point of work piece 6 now lies on the vertical axis A of spindle 2.

While the apparatus and method of the invention have been described in this specification and in the drawings by reference to their application to a machine tool having a vertically-disposed drive member, such as a vertical mill, it will be apparent to one skilled in the art that the apparatus and method may readily be adapted for application to machine tools having drive members with other than a vertical orientation, such as a horizontal boring mill.

Further, while the apparatus and method of the invention are described with reference to drawings depicting a substantially square work piece, it will be apparent to one skilled in the art that the apparatus and method invention may readily be utilized for centering work pieces of various other shapes, for example, work pieces having outer edges which are circular or polygonal in shape.

Moreover, embodiments of the apparatus of the invention other than the preferred one described in detail herein are within the scope of the instant invention. Such other embodiments include, for example, ones in which one or more of the marks by which the device is aligned are inscribed upon the machine spindle itself. It is therefore contemplated that the instant invention be limited only by the claims appended hereto and not by the preferred embodiment described herein.

I claim:

1. A centering device for use with a machine tool having a drive member with a center axis and having a work platform in opposed relation to said drive member for accommodating a work piece, said centering device being adapted for attachment to said drive member and comprising a stationary member;

a moveable member positioned adjacent to said stationary member, said moveable member having indicator means for contacting a work piece and being moveable throughout a substantially 360 degree arc in a plane substantially perpendicular to the center axis of said drive member;

fixing means for alternatively permitting or preventing movement of said moveable member relative to said stationary member; and, locating means on said moveable member and on said stationary member for indicating the relative position of said moveable member to said stationary member in each quadrant of said arc for permitting determination of the center point of the work piece.

2. A centering device according to claim 1 wherein said moveable member comprises a rotatable element and indicator means attached to said rotatable element.

3. A centering device according to claim 1 wherein said moveable member includes said fixing means.

4. A centering device according to claim 1 wherein said stationary means includes said fixing means.

5. A centering device according to claim 1 wherein said moveable member has an arcuate edge portion having at least one indicia thereon which defines at least one point on said arcuate edge.

6. A centering device according to claim 2 wherein said indicator means includes a resilient sensing means for contacting said work piece.

7. A centering device according to claim 1 wherein said locating means comprises the combination of at least one first indicia defining a point on one of said stationary or moveable members, and at least four second indicia on the other of said stationary or moveable members, wherein said second indicia define points disposed at 90 degree intervals about a 360 degree arc, and said indicia on said moveable member are alignable with the indicia on said stationary member by moving said moveable member with respect to said stationary member.

8. A centering device according to claim 7 wherein said first indicia is on said moveable member.

9. A centering device according to claim 1 wherein said stationary member includes means for supporting said moveable member.

10. A centering device according to claim 9 wherein said supporting means comprises at least one collar.

11. A centering device according to claim 10 wherein said collar has at least four indicia thereon adjacent to and disposed in a 360 degree arc about said moveable member at 90 degree intervals.

12. A centering device for use with a machine tool having a drive member with a center axis and having a work platform in opposed relation to said drive member for accommodating a work piece, said centering device being connected to said drive member and comprising a stationary member;

a rotatable member positioned adjacent to said stationary member and being moveable throughout a substantially 360° arc, said rotatable member having an aperture for accommodating a portion of said stationary member and having an arcuate edge portion;

indicator means attached to said rotatable member, said indicator means having a resilient sensing means for contacting a work piece;

at least one collar member attached to said stationary member for supporting said rotatable member;

fixing means for alternatively permitting or preventing rotation of said rotatable member relative to said stationary member; and, at least one first indicia defining a point on one of said stationary or rotatable members, and at least four second indicia defining points disposed at 90 degree intervals about a 360 degree arc on the other of said stationary or rotatable members, said indicia on said rotatable member being alignable with said indicia on said stationary member by rotating said rotatable member with respect to said stationary member, for permitting determination of the center point of the work piece.

13. A method of centering a work piece on a machine tool having a drive member with a center axis, having a centering device connected to said drive member, said centering device having a portion moveable throughout a substantially 360 degree arc with respect to said drive member, said machine tool further having a work bed, and having a work platform in opposed relation to said drive member and supported by said work bed with a surface for accommodating a work piece, said work platform being moveable with respect to said work bed, and having means for indicating the position of said work platform with respect to said work bed, said method comprising the steps of (a) moving said work platform, with the work piece attached, in a first direction toward said moveable portion until a first edge of said work piece contacts said moveable portion; and observing the position of said work platform with respect to said work bed;

(b) moving said moveable portion through a 180 degree arc; moving said work platform in a second direction toward said moveable portion until a second edge of said work piece contacts said moveable portion; and observing the position of said work platform with respect to said work bed; and, moving said work platform so that it is at a position midway between the positions observed in step (a) and this step (b);

(c) moving said moveable portion through a 90 degree arc; moving said work platform in a third direction toward said moveable portion until a third edge of said work piece contacts said moveable portion; and observing the position of said work platform with respect to said work bed;

(d) moving said moveable portion through a 180 degree arc; moving said work platform in a fourth direction toward said moveable portion until a fourth edge of said work piece contacts said moveable portion; observing the position of said work platform with respect to said work bed; and moving said work platform so that it is at a position midway between the positions observed in step (c) and this step (d).

* * * * *